Aug. 14, 1962  J. E. HANCOCK  3,048,934
CONVEYOR MOUNTING FOR ELEVATING SCRAPER
Filed Sept. 12, 1960  6 Sheets-Sheet 1
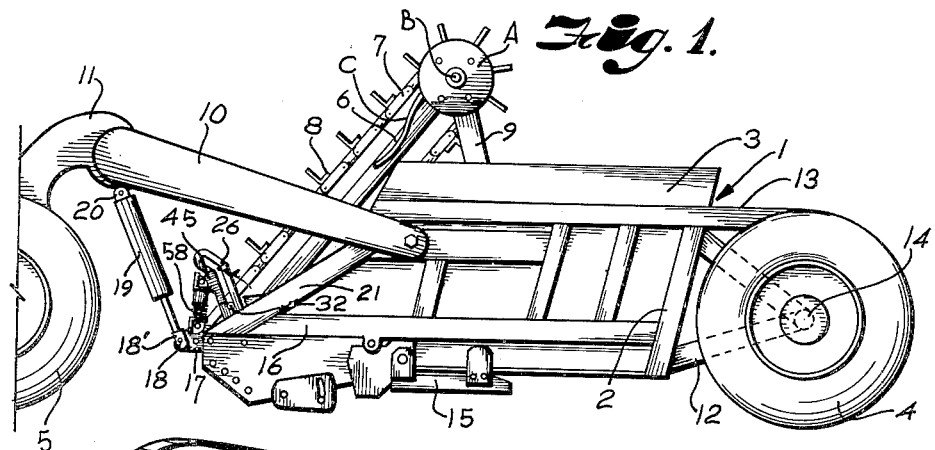
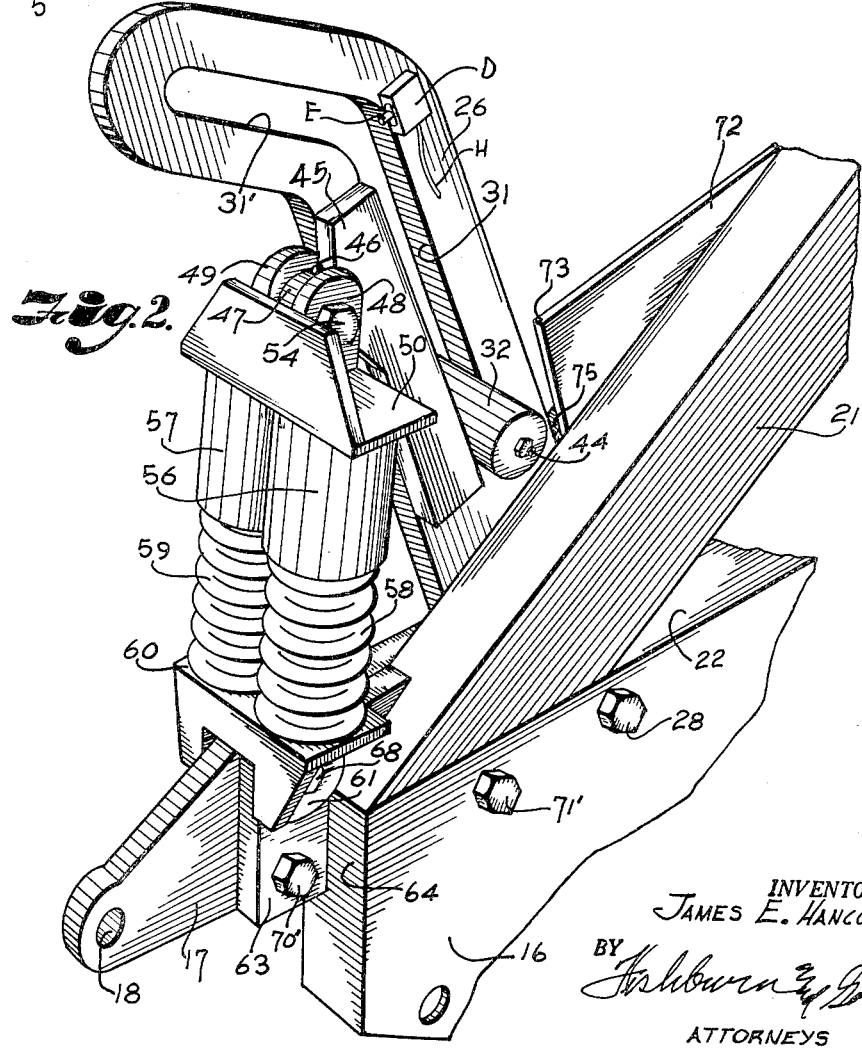
INVENTOR.
JAMES E. HANCOCK
BY
Ashburn & Gold
ATTORNEYS

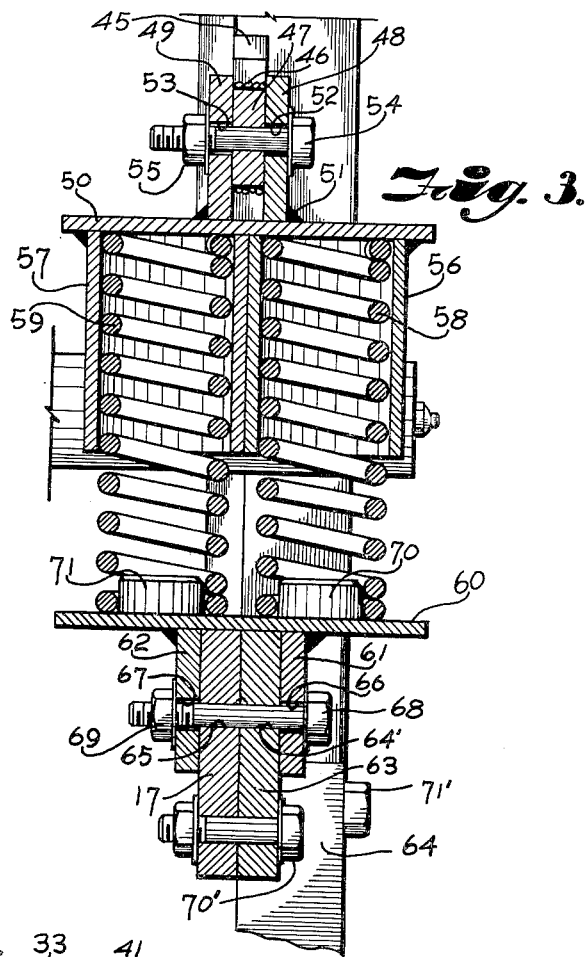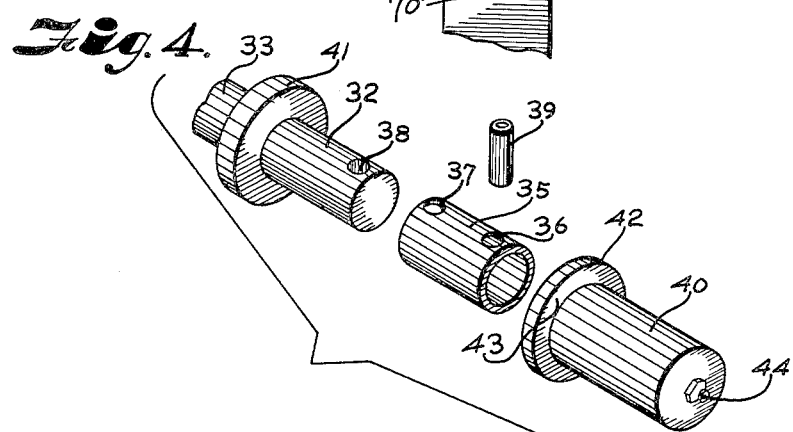

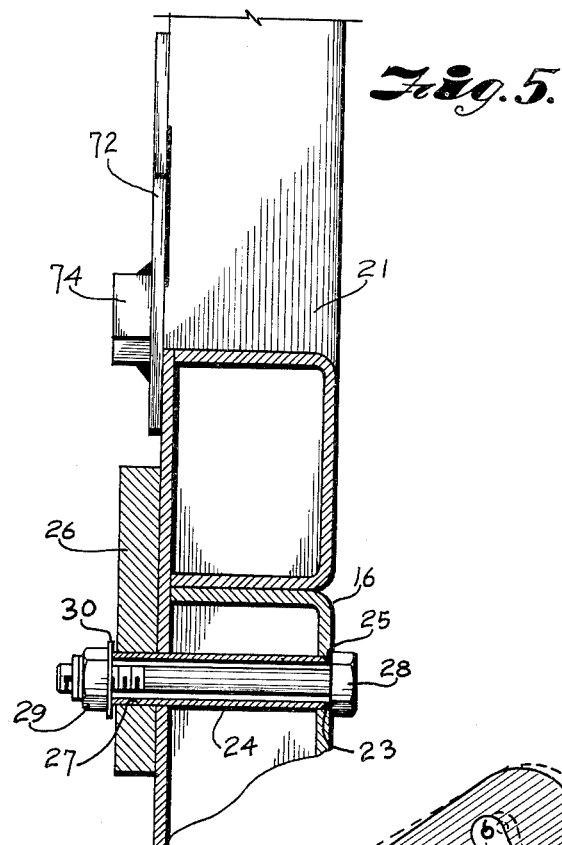
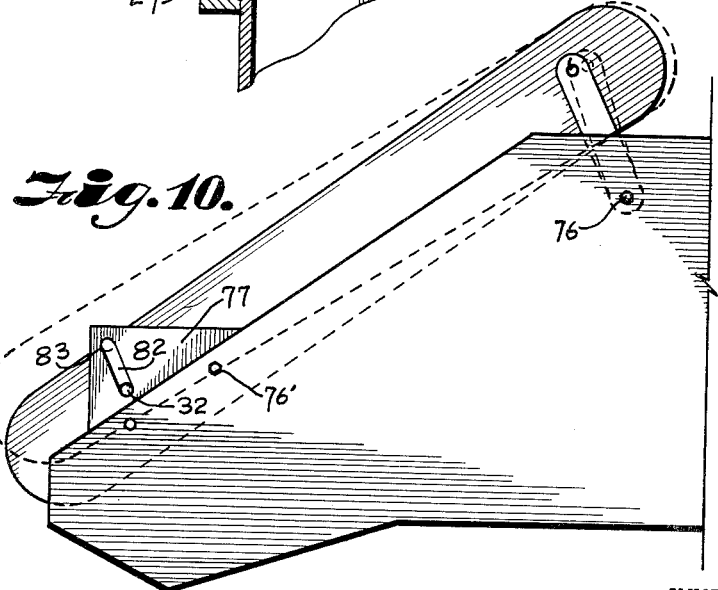

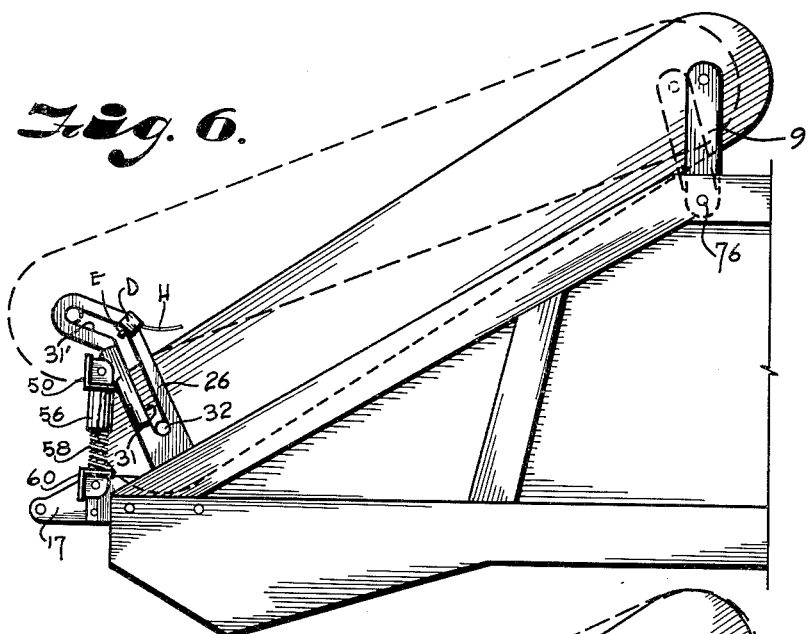
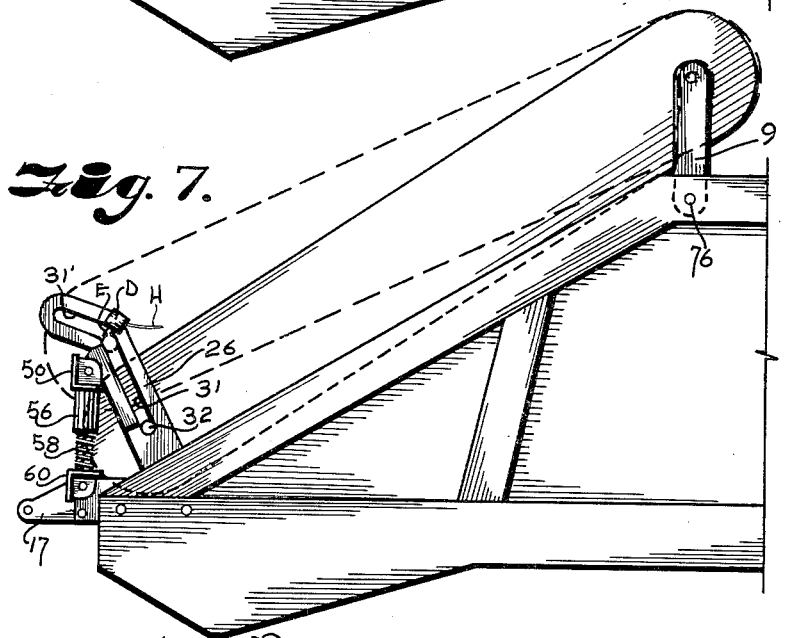
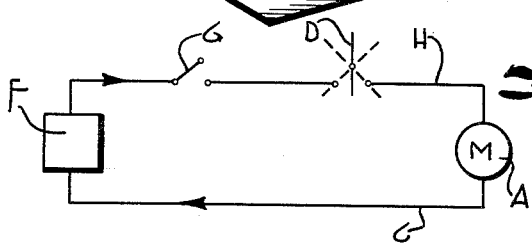

Aug. 14, 1962 J. E. HANCOCK 3,048,934
CONVEYOR MOUNTING FOR ELEVATING SCRAPER
Filed Sept. 12, 1960 6 Sheets-Sheet 5
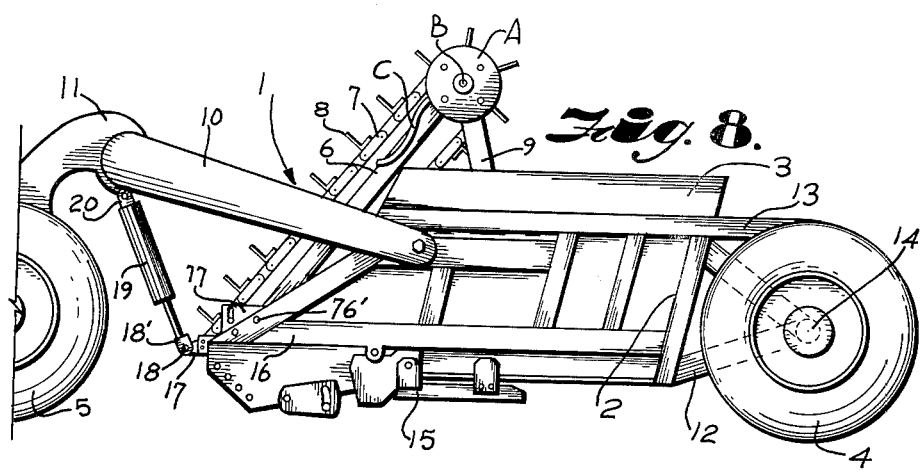
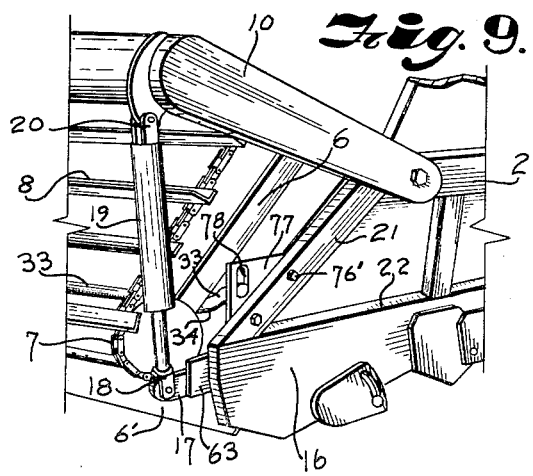
INVENTOR.
JAMES E. HANCOCK
BY
ATTORNEYS INVENTOR.
JAMES E. HANCOCK
BY
Fishburn & Gold
ATTORNEYS

United States Patent Office 3,048,934
Patented Aug. 14, 1962

3,048,934
CONVEYOR MOUNTING FOR ELEVATING SCRAPER
James E. Hancock, % Hancock Manufacturing Company, P.O. Box 1359, Lubbock, Tex.
Filed Sept. 12, 1960, Ser. No. 55,386
9 Claims. (Cl. 37—129)

This invention relates to earth handling apparatus and more particularly to a mounting of the conveyor of the dirt to the box of the apparatus.

This invention is an improvement over earth handling apparatus shown in my Patents Nos. 2,791,041 and 2,931,451, and applications for patent Serial No. 729,607, filed April 21, 1958, now Patent No. 2,988,832, and Serial No. 815,175, filed May 22, 1959, now Patent No. 2,994,976.

The principal object of the present invention is to provide a mounting for the elevator or conveyor of the dirt as it is picked up and moved to the box of the scraper whereby when the elevator strikes a hard object, such as a rock, the forward lower end of the conveyor will move upwardly and forwardly to relieve the shock from the upper end portion mounting of the conveyor.

Other objects of the present invention are to provide a scraper having a mobile frame and a box for receiving the dirt elevated by the conveyor; to provide the frame with a bracket or rocker arm on each side of the forward portion thereof pivotally mounted on the frame and provided with a longitudinal slot therein for receiving the ends of shafts forming a part of the conveyor whereby the brackets or arms may be moved forwardly should the conveyor strike a rock or the like and also move upwardly; to provide a pivotal mounting for the rear upper end of the conveyor to allow rearward movement also of the conveyor; to provide spring means on the forward end of the frame structure on each side thereof whereby when the conveyor strikes a hard object there will be imparted thereto a rolling motion rather than a jerking motion, the spring means forming a shock absorbing element for the conveyor and imparting a vibrating motion to the conveyor which facilitates digging of the drags or slats of the conveyor into the material and acting to slow the rotation of the elevator chain to allow deceleration of the driving means of the elevator.

Other objects of the present invention are to provide brackets on each side of the frame structure having their upper ends extending at an angle forwardly and having slots therein for receiving the ends of the shafts upon which the forward end of the conveyor rotates whereby upon striking of a hard object, the forward end of the conveyor will rise upwardly and forwardly when the forward end of the elevator or conveyor reaches its upper limit in the slot; to provide means for driving said elevator or conveyor; to provide means adjacent said slots in the arms for cutting off and starting said driving means, and to provide a device of this character simple and economical to manufacture.

Other objects and advantages of this invention will become apparent from the following description taken in connection with the accompanying drawings wherein are set forth by way of illustration and example certain embodiments of this invention.

FIG. 1 is a side view of my earth handling apparatus particularly illustrating the mounting of the forward end of the conveyor and the spring shock absorbing means.

FIG. 2 is an enlarged fragmentary perspective view of the spring shock absorbing means for the conveyor.

FIG. 3 is an enlarged cross sectional fragmentary view through the spring means for the conveyor.

FIG. 4 is an enlarged disassembled view showing the end of the shaft on the forward end of the conveyor.

FIG. 5 is an enlarged cross sectional fragmentary view of the rocker arm assembly.

FIG. 6 is a fragmentary side view of the mounting of the elevator with the forward end shown in the extreme upper and forward movement.

FIG. 7 is a view similar to FIG. 6 with the forward end of the elevator at the upper end of the vertical slot portion of the rocker arm.

FIG. 8 is a side view of a modified form of mounting of the forward end of the conveyor.

FIG. 9 is a fragmentary enlarged view particularly illustrating the mounting.

FIG. 10 is an enlarged fragmentary side view illustrating the movement of the conveyor and its movement shown in dotted lines.

FIG. 13 is a diagrammatic view showing the wiring for the driving means for the elevator and the cut-off or limit switch on the rocker arms.

Figure 11:
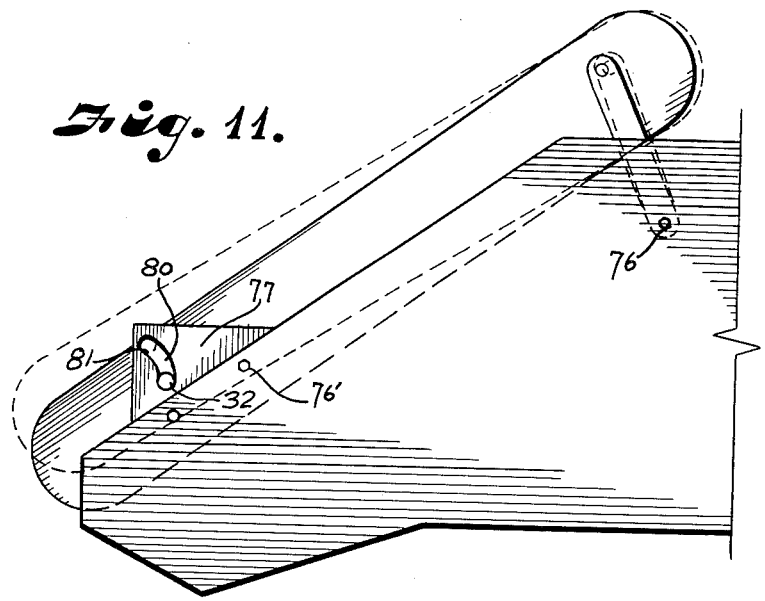
FIG. 11 is a view similar to FIG. 10 but showing the slot in the bracket in a slightly curved position.
Figure 12:
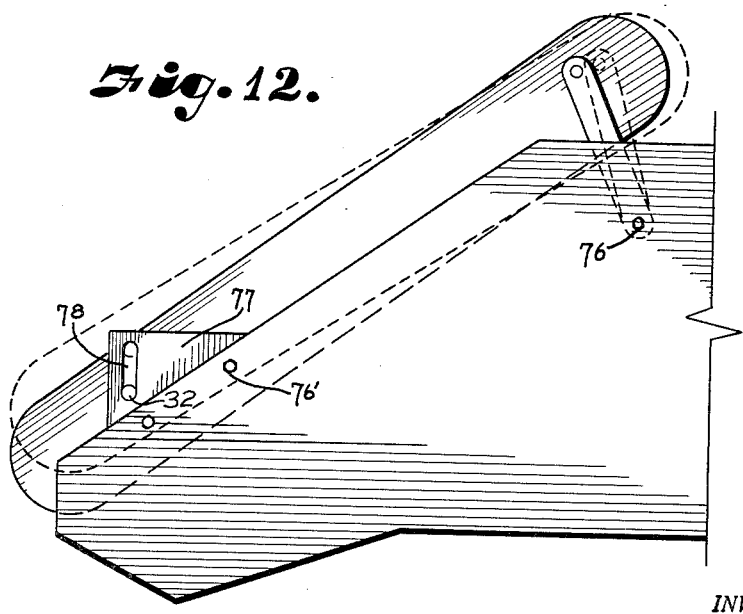
FIG. 12 is an enlarged fragmentary side view of the bracket on the forward end of the frame for the mounting of the conveyor shown in FIG. 8 with the movement of the conveyor illustrated in dotted lines.

Referring more in detail to the drawings:

1 designates earth handling apparatus embodying the features of my invention consisting of a frame 2 having sides providing a dirt containing box 3, rear wheels 4 and front wheels 5. The present device being illustrated as a pull type elevator although it may be adapted for a self-propelled type also.

6 designates a conveyor or elevator of the type illustrated in my Patent No. 2,791,041 which moves the dirt from the scraper blade 6' (FIG. 9), and also illustrated in said patent, as the blade loosens the dirt from the ground and the conveyor moves it to the box 3. The conveyor or elevator mechanism includes spaced chains 7 to which are secured transverse flights or drags 8. The chains are trained over sprockets at the upper and lower end of the conveyor, the upper end of the conveyor being mounted on the frame of the tractor by arms 9, also as illustrated in my Patent No. 2,931,451, and as illustrated in FIGS. 1, 6, 7, 8, 10, 11 and 12 of the present drawings.

The forward end of the frame has a pair of arms 10 connected to a gooseneck 11 having a fifth wheel connection to the axle and front wheels of the device, also as illustrated in my Patent No. 2,931,451. The rear end of the frame includes a lower member 12 and an upper member 13 connected to the rear axle 14 of the wheels 4 supporting the framework.

The box 3 has an open front bottom portion (not shown) and a sliding door mechanism 15 as illustrated in my copending application, Serial No. 729,607, now Patent No. 2,988,832.

The frame includes lower spaced side rails 16 on each side thereof. Welded or otherwise suitably secured on the inside thereof is an arm 17, extending forwardly of the rail and having an opening 18 in the ends thereof to which are pivotally mounted one end 18' of an extension member 19, the other end being pivotally mounted as at 20 to the arms 10 for raising and lowering the cutting blade and frame from a ground digging position to a load transporting position.

Brace arms 21 have their lower ends welded or otherwise suitably secured to the upper side 22 of the frame side members 16 and extend upwardly along the front portion of the framework 2. The forward portion of the side members 16 is provided with openings 23 (FIG. 5) for receiving a sleeve or bushing 24 acting as a spacer for the side members 16 and are welded in the openings as indicated at 25. Rocker arms 26 are provided for engaging on the inside of the arms or side members 16 and have an opening 27 therein for also receiving the end of the sleeve or spacer 24. The rocker arms 26 are pivotally mounted to the frame by a bolt 28 having a nut 29 and a washer 30 on the threaded ends thereof. The rocker arm is provided at substantially the longitudinal center with a slot 31 which guides the movement of the front of the conveyor. Each side of the framework structure is provided with a rocker arm and as they are identical, only one will be described.

The upper end of the rocker arm is turned forwardly at approximately a 45° angle as illustrated in FIG. 2 and the slot 31 is extended thereinto as shown at 31'.

Adapted to engage in the slots 31 are ends 32 of a shaft 33 secured to the conveyor 6 as best illustrated in FIG. 9. It will be seen that the shaft is turned slightly laterally giving a slight crank arrangement as indicated at 34 (FIG. 9).

As illustrated in FIG. 4, the ends 32 of the shaft have a bushing 35 slidable over the ends 32 and have spaced openings 36 and 37 adapted to align with a transverse opening 38 in the end of the shaft for receiving a pin 39 for retaining the bushing on the end of the shaft. The two openings are provided so that should the bushing become worn, it may be removed and the bushing turned end to end and again placed on the end of the shaft to get longer wear therefrom. The ends of the shaft 32 also includes a shock roller member or assembly 40 which fits over the bushing and end of the shaft. The ends of the shaft also have a collar 41 and the shock roller assembly has a collar 42 which engages against the collar 41 when assembled. The collar 41 prevents the roller assembly 40 from moving inwardly away from the rocker arm and the side 43 of the collar 42 engages against the inside of the rocker arm to prevent the collar from being removed therefrom. The ends of the rocker assembly is provided with a zerk fitting 44 for lubricating the device.

Welded or otherwise suitably secured to the outside of the rocker arms 26 are plates 45 and welded thereto as indicated at 46 are bearing members 47 for receiving spaced ears 48 and 49 rigidly secured to a plate 50 by welding as indicated at 51 (FIG. 3). The ears 48 and 49 are provided with openings 52 and 53 for receiving a bolt or the like 54 having a nut 55 on the threaded end thereof for pivotally attaching the shock absorbing mechanism to the bearing 47 now to be described.

Substantially circular housing members 56 and 57 are welded or otherwise suitably secured to the underneath side of the plate 50 as illustrated in FIG. 3 for receiving one end of coil springs 58 and 59 and retaining the same therein. A bracket plate 60 having depending ears 61 and 62 is pivotally mounted on the plate arm 17 and to a bracket member 63 welded to the end 64 of the side member 16 and having its upper end beveled and secured to the brace member 21 also by welding or other suitable means. The arm 17 and bracket 63 have aligned openings 64' and 65 also aligning with openings 66 and 67 in the ears 61 and 62 for receiving a bolt or the like 68 having a nut 69 for pivotally mounting the bracket plate 60 on the side members forming a part of the side of the frame. The bracket plate 60 is provided with spaced upstanding bosses 70 and 71 engaging within the open lower ends of the coil springs 58 and 59 and preventing slippage of the springs from the bracket plate as best illustrated in FIG. 3. The bracket member 63 and arm 17 are secured together by a bolt 70' and the arm 17 is also bolted to the side member 16 by a bolt 71' (FIG. 2).

Plates or brackets 72 are welded or otherwise suitably secured to the inside of the side members 21 of the framework structure and have a substantially vertical forward end 73. The plates 72 are narrower than the rocker arm 26 as illustrated in FIG. 5. Welded to the outside of the plates 72 are lugs 74 which extend forwardly of the forward edge 73 of the plate 72 as illustrated at 75 (FIG. 2) to form stops for the rocker arms 26 to prevent their rearward travel against the forward ends 73 of the plates 72. The lugs will hold the rocker arms 26 away from the plates and thus prevent dirt or other matter from accumulating against the end of the plates. The stops also prevent the elevator or conveyor from falling backward on the pivoted arms 9. This will also allow the arms 9 to be positioned in a forward position to lighten the lower end of the conveyor, and lessen breakage of equipment in handling rocks or rocky material.

The conveyor and particularly the sprocket and chain arrangement thereof may be operated or rotated by the power from the vehicle or the tractor pulling the same, but I have here illustrated an electric motor A mounted on one outer end of the shaft B of the mounting of the conveyor on the arms 9. The electric motor has electrical connection C with a source of supply (not shown).

At the juncture between the slot 31 and slot 31' in the rocker arm 26 I provide a cut-off or limit switch D having the usual spring pressed toggle arm E so that when the end 32 of the shaft rises upwardly it will strike the toggle lever or arm E as shown in FIG. 7 and cut off the electric motor A and thereby stop rotation of the conveyor.

After the conveyor passes over the hard object the lower forward end will then drop by gravity in the slot 31' and again strike the toggle lever E to again energize the motor A.

In FIG. 3 I have diagrammatically illustrated the electric power source and F indicates the energy for the electric current and G the main switch in the line C and a line H which is connected to the cut-off or limit switch D.

Operation of a device constructed and assembled as above described is as follows:

Operation of the extension member 19 will lower the frame of the mobile vehicle to the ground and allow the blade 6' to dig into the dirt and move the dirt toward the box 3. As it moves into the box the elevator 6 operated by the motor A will be rotating in an anticlockwise direction and the flights 8 will dig into the dirt and move it into the rear portion of the box. The conveyor will be free to move upwardly at its forward end due to the ends 32 of the shaft 33 being mounted in the slot 31 of the rocker arms 26. Should the dirt be of sufficient amount and depth it will cause the front end of the conveyor 6 to move upwardly while still moving the dirt rearwardly into the box. The upper end of the conveyor being pivoted to the frame on arm 9 by bolts 76 (FIGS. 10, 11 and 12) and the forward end of the conveyor being movable due to the mounting in the pivoted rocker arm 26, the conveyor is free to move forwardly under heavy load and particularly when it strikes a rock or other hard object, the rocker arms will pivot on the pin 28 and being secured to the shock absorbing element through the plate 45 mounted on the side thereof will cause the coil springs 58 and 59 to absorb the shock of the conveyor striking the hard object and will also allow further forward movement of the conveyor due to the shock absorbing element being pivoted by the bracket 60 on the arm 17 and bracket plate 63 on each side of the frame of the vehicle, thus tending to impart a rolling action rather than a jerking motion to the conveyor and in addition thereto a vibrating motion to the flights or drags on the conveyor facilitating digging into the earth material. The elevator or conveyor with this mechanism for mounting the same may roll forward approximately 3 inches thus taking the jar and sudden shock off of the mounting of the conveyor in the frame.

If the object which is contacted by the lower forward end of the conveyor is of sufficient size to cause further upward movement of the conveyor, the ends 32 of the shaft 33 will move past the cut-off switch D and into the slots 31' which extend at approximately a 45° angle from the main portion of the rocker arms. The slots 31' plus the spring shock elements will allow the elevator to move forward on its pivoted mountings to a distance of approximately one foot.

This permits the elevator to go over rocks and other hard objects of considerable size. When the ends of the shafts strike the cut-off switch at the juncture of the angle of the slot, the current is cut-off from the electric motor and by the time the elevator reaches the extreme end of the slot the motor will be decelerated.

The stop member 74 will limit rearward movement of the rocker arms 26 and prevent falling backwardly of the conveyor in the box.

When the elevator is operating as above described, the supports or ends of the shaft are working in the portion of the slot 31. The object struck may be of sufficient size or rigidity to stop the lower chain of the conveyor. The conveyor or elevator will move forwardly and upwardly pushing against the springs 58 and 59. The upper part of the elevator chain will still be traveling at least until all the slack is taken up.

While the upper elevator chain travels forwardly the conveyor is pushing against the springs and the sprocket continues to turn but in a decelerated manner as it pushes or contracts the springs. Due to this heavy braking force on the conveyor, the electric motor will also be decelerated to avoid extereme shocks in the driving means of the motor and thus prevent breakage.

In FIGS. 8, 9, 10, 11, and 12 I have illustrated a modified form of mounting of the forward end of the conveyor on the frame. The mobile vehicle is constructed as described in the preferred form of the invention and the parts have been given like numbers.

Mounted on the inside of the side members 16 and the brace members 21 of the frame 2 by bolts or the like 76' is a bracket mounting plate or guide 77 having a vertical slot 78 near its forward end. The ends 32 of the shafts 33 are adapted to engage in the slot 78 and in operation when the forward end of the conveyor 6 strikes a hard object or rocks, the front end of the conveyor will rise due to its mounting in the slot and will assume the movement as shown in FIG. 8. In other words, the forward end moves upwardly and in the entire conveyor moves backwardly as shown in dotted lines in FIG. 12.

FIG. 11 illustrates a further view wherein the slot 80 and the bracket plate or mounting member 77 is curved or arcuate with the upper end 81 extending forwardly of the lower end so that in operation the forward end will move upwardly due to the arcuate slot and also backwardly as illustrated in dotted lines in FIG. 9.

In FIG. 10 I have illustrated a further view wherein the slot 82 extends at an angle with the upper end 83 forwardly of the lower end of the slot in the mounting plate 77 so that in operation the conveyor will move upwardly at its forward end and also backwardly or rearwardly as illustrated in dotted lines in FIG. 10.

It will be obvious from the foregoing that I have provided an improved mounting for a conveyor or elevator in an earth handling apparatus wherein the shock of the conveyor striking a hard object will be lessened and the tendency to damage the equipment will also be lessened and wherein the springs forming part of the shock absorbing element will cause a vibration of the forward end of the elevator to cause greater digging of the flights into the earth, and also provide for deceleration of the motor driving the elevator, thus preventing breakage of equipment.

It will further be obvious that in the modified forms of the invention, that an improved mounting wherein the conveyor or elevator will have a movement to lessen shocks of striking hard objects and movement of the elevator on its pivotal mounting to lessen breakage of the equipment.

It is to be understood that while I have illustrated and described one form of my invention, it is not to be limited to the specific form or arrangement of parts herein described and shown except insofar as such limitations are included in the claims.

What I claim and desire to secure by Letters Patent is:

1. In earth handling apparatus having a frame with an open front earth-collecting box on said frame and a scraper blade mounted on said frame in advance of said earth-collecting box, an endless conveyor structure having a lower run for moving earth from said scraper blade into said earth-collecting box, said conveyor extending upwardly and rearwardly with respect to said frame, means mounting the upper portion of the conveyor structure on the frame for forward and rearward movement of said upper portion of the conveyor structure relative to said frame, guide members on and extending outwardly at sides of the lower end of the conveyor structure, arms having lower portions pivoted relative to said frame at sides of the lower portion of said conveyor structure and having elongate slots in which said guide members are slidably received, said slots extending upwardly relative to the frame, resilient means having engagement with said frame and arms and yieldably resisting forward swinging movement of said arms, and means operatively connected with said conveyor for driving same and moving the lower run rearwardly whereby on engagement of the conveyor with a large hard-to-move object said engagement of the conveyor will apply a force swinging the arms forwardly with the resilient means cushioning the shock and said guide members moving in said slots to effect an upward and forward movement of the lower end of the conveyor.

2. In earth handling apparatus having a frame with an open front earth-collecting box on said frame and a scraper blade mounted on said frame in advance of said earth-collecting box, an endless conveyor structure having side members with an endless conveyor therebetween with a lower run for moving earth from said scraper blade into said earth-collecting box, said conveyor extending upwardly and rearwardly with respect to said frame, means mounting the upper portion of the conveyor structure on the frame for forward and rearward movement of said upper portion of the conveyor structure relative to said frame, guide pins on and extending outwardly of the conveyor side members at the lower end of the conveyor structure, arms having lower portions pivoted relative to said frame at sides of the lower portion of said conveyor side members and having elongate slots in which said guide pins are slidably received, said slots extending upwardly and forwardly relative to the frame, resilient means having engagement with said frame and arms and yieldably resisting forward swinging movement of said arms, and power means operatively connected with said conveyor for driving same and moving the lower run rearwardly whereby on engagement of the conveyor with a large hard-to-move object said engagement of the conveyor will apply a force swinging the arms forwardly with the resilient means cushioning the shock.

3. In earth handling apparatus having a frame with an open front earth-collecting box on said frame and a scraper blade mounted on said frame in advance of said earth-collecting box, an endless conveyor structure having a lower run for moving earth from said scraper blade into said earth-collecting box, said conveyor extending upwardly and rearwardly with respect to said frame, means pivotally linking the upper portion of the conveyor structure to the frame for longitudinal swinging movement of said upper portion of the conveyor structure, guide members on and extending outwardly at sides of the lower end of the conveyor structure, arms having lower portions pivoted relative to said frame at sides of the lower portion of said conveyor structure and having elongate slots in which said guide members are slidably received, said slots extending upwardly and forwardly relative to the frame, resilient means having engagement with said frame and arms and yieldably resisting forward swinging movement of said arms, and power means operatively connected with said conveyor for driving same and moving the lower run rearwardly whereby on engagement of the conveyor with a large hard-to-move object said engagement of the conveyor will apply a force swinging the arms forwardly with the resilient means cushioning the shock and said guide members moving upwardly and the lower end of the conveyor structure forwardly effecting an upward and forward movement of the lower end of the conveyor with such forward movement being opposite to the direction of operative movement of the conveyor lower run to thereby reduce relative movement of said lower run and said large hard-to-move object.

4. In earth handling apparatus having a frame with an open front earth-collecting box on said frame and a scraper blade mounted on said frame in advance of said earth-collecting box, a conveyor structure having side members with an endless conveyor therebetween with a lower run for moving earth from said scraper blade into said earth-collecting box, said conveyor extending upwardly and rearwardly with respect to said frame, means pivotally linking the upper portion of the conveyor side members to the frame for longitudinal swinging movement of said upper portion of the conveyor structure, a shaft on the lower end of the conveyor structure and having ends extending outwardly at sides thereof, arms having lower portions pivoted relative to said frame at sides of the lower portion of said conveyor structure and having elongate slots in which said shaft ends are slidably received, said slots extending upwardly and forwardly relative to the frame, means on said frame limiting rearward swinging movement of said arms, resilient means having engagement with said frame and arms and yieldably resisting forward swinging movement of said arms, and power means operatively connected with said conveyor for driving same and moving the lower run rearwardly whereby engagement of the conveyor with a large hard-to-move object will apply a force urging swinging of the arms forwardly with the resilient means cushioning the shock and said shaft ends to move in said slots to effect upward and forward movement of the lower end of the conveyor with such forward movement being opposite to the direction of operative movement of the conveyor lower run to thereby reduce relative movement of said lower run and said large hard-to-move object.

5. In earth handling apparatus having a frame with an open front earth-collecting box on said frame and a scraper blade mounted on said frame in advance of said earth-collecting box, a conveyor structure having side members with an endless conveyor therebetween with a lower run for moving earth from said scraper blade into said earth-collecting box, said conveyor extending upwardly and rearwardly with respect to said frame, means pivotally linking the upper portion of the conveyor side members to the frame for longitudinal swinging movement of said upper portion of the conveyor structure, a shaft on the lower end of the conveyor structure and having ends extending outwardly at sides thereof, arms having lower portions pivoted relative to said frame at sides of the lower portion of said conveyor structure and having elongate slots in which said shaft ends are slidably received, said slots extending upwardly and forwardly relative to the frame, means on said frame limiting rearward swinging movement of said arms, power means operatively connected with said conveyor for driving same and moving the lower run rearwardly whereby on engagement of the conveyor with a large hard-to-move object said engagement of the conveyor will apply a force swinging the arms forwardly, and shock absorbing means mounted on said frame forwardly of said arms and having connection with said arms for cushioning the shock when said lower end of the conveyor strikes a large hard-to-move object, said last-named means including a bearing member rigidly carried by said arms forwardly thereof, a bracket plate pivotally attached to said bearing member, a bracket plate pivotally mounted on said frame in spaced below relation to said first-named bracket plate, coil springs having their ends engaging the respective bracket plates, the first-named bracket plate having housings depending therefrom in surrounding relation to the upper ends of said springs, and said second-named bracket plate having means engaging the lower ends of said springs and cooperating with said housings for retaining said springs in place.

6. In earth handling apparatus having a frame with an open front earth-collecting box on said frame and a scraper blade mounted on said frame in advance of said earth-collecting box, an endless conveyor structure having a lower run for moving earth from said scraper blade into said earth-collecting box, said conveyor extending upwardly and rearwardly with respect to said frame, means pivotally linking the upper portion of the conveyor structure to the frame for longitudinal swinging movement of said upper portion of the conveyor structure, guide members on and extending outwardly at sides of the lower end of the conveyor structure, arms having lower portions pivoted relative to said frame at sides of the lower portion of said conveyor structure, said arms extending upwardly relative to the conveyor and terminating in a forwardly extending upper portion, said arms having elongate slots extending generally longitudinally of the arm portions whereby the slots have a lower portion terminating in an angularly related forwardly extending upper portion, said guide members being slidably received in said elongate slots, means on said frame limiting rearward swinging movement of said arms, resilient means having engagement with said frame and arms and yieldably resisting forward swinging movement of said arms, power means operatively connected with said conveyor for driving same and moving the lower run rearwardly, said conveyor arms and resilient means being arranged whereby when the lower run of the conveyor engages a large hard-to-move object the force applied thereagainst will swing the arms forwardly and effect upward and forward movement of the guide members in said slots and the corresponding movement of the lower portion of the conveyor thereby relieving the force applied to the arms by the conveyor whereby the resilient means will swing said arms rearwardly to effect an upward swinging movement of the lower end of the conveyor to permit the conveyor to rise over the hard-to-move object.

7. In earth handling apparatus having a frame with an open front earth-collecting box on said frame and a scraper blade mounted on said frame in advance of said earth-collecting box, an endless conveyor structure having a lower run for moving earth from said scraper blade into said earth-collecting box, said conveyor extending upwardly and rearwardly with respect to said frame, means pivotally linking the upper portion of the conveyor structure to the frame for longitudinal swinging movement of said upper portion of the conveyor structure, guide members on and extending outwardly at sides of the lower end of the conveyor structure, arms having lower portions pivoted relative to said frame at sides of the lower portion of said conveyor structure, said arms extending upwardly relative to the conveyor, said arms having elongate slots extending generally upwardly relative to said frame and having upper and lower ends, said guide members being slidably received in said elongate slots, means on said frame limiting rearward swinging movement of said arms, resilient means having engagement with said frame and arms and yieldably resisting forward swinging movement of said arms, power means operatively connected with said conveyor for driving same and moving the lower run rearwardly, an electric circuit including a switch positioned on said arms spaced between the upper and lower ends of the slots and operatively connected with said power means whereby movement of the guide members upwardly past said switch in response to engagement of the lower end of the conveyor with a hard-to-move object will effect stopping of the power means and then movement downwardly of the guide members past said switch will effect restarting of the power means.

8. In earth handling apparatus having a frame with an open front earth-collecting box on said frame and a scraper blade mounted on said frame in advance of said earth-collecting box, an endless conveyor structure having a lower run for moving earth from said scraper blade into said earth-collecting box, said conveyor extending upwardly and rearwardly with respect to said frame, means pivotally linking the upper portion of the conveyor structure to the frame for longitudinal swinging movement of said upper portion of the conveyor structure, guide members on and extending outwardly at sides of the lower end of the conveyor structure, arms having lower portions pivoted relative to said frame at sides of the lower portion of said conveyor structure, said arms extending upwardly relative to the conveyor and terminating in a forwardly extending upper portion, said arms having elongate slots extending generally longitudinally of the arm portions whereby the slots have a lower portion terminating in an angularly related forwardly extending upper portion, said guide members being slidably received in said elongate slots, means on said frame limiting rearward swinging movement of said arms, resilient means having engagement with said frame and arms and yieldably resisting forward swinging movement of said arms, power means operatively connected with said conveyor for driving same and moving the lower run rearwardly, an electric circuit including a switch positioned on said arms adjacent the intersection of the upper and lower portions of the slots and operatively connected with said power means whereby movement of the guide members upwardly past said switch in response to engagement of the lower end of the conveyor with a hard-to-move object will effect stopping of the power means and then movement downwardly of the guide members past said switch will effect restarting of the power means.

9. In earth handling apparatus having a frame with an open front earth-collecting box on said frame and a scraper blade mounted on said frame in advance of said earth-collecting box, an endless conveyor structure having a lower run for moving earth from said scraper blade into said earth-collecting box, said conveyor extending upwardly and rearwardly with respect to said frame, means pivotally linking the upper portion of the conveyor structure to the frame for longitudinal swinging movement of said upper portion of the conveyor structure, guide members on and extending outwardly at sides of the lower end of the conveyor structure, arms having lower portions pivoted relative to said frame at sides of the lower portion of said conveyor structure, said arms extending upwardly relative to the conveyor and terminating in a forwardly extending upper portion, said arms having elongate slots extending generally longitudinally of the arm portions whereby the slots have a lower portion terminating in an angularly related forwardly extending upper portion, said guide members being slidably received in said elongate slots, means on said frame limiting rearward swinging movement of said arms, resilient means having engagement with said frame and arms and yieldably resisting forward swinging movement of said arms, power means operatively connected with said conveyor for driving same and moving the lower run rearwardly, an electric circuit including a switch positioned on said arms adjacent the intersection of the upper and lower portions of the slots and operatively connected with said power means whereby movement of the guide members upwardly past said switch in response to engagement of the lower end of the conveyor with a hard-to-move object will effect stopping of the power means and the movement downwardly of the guide members past said switch will effect restarting of the power means, said arms and resilient means being arranged whereby when the lower run of the conveyor engages a large hard-to-move object the force applied thereagainst will swing the arms forwardly and effect upward and forward movement of the guide members in said slots and corresponding movement of the lower portion of the conveyor until the guide members pass the switch stopping the power means thereby relieving the force applied to the arms whereby the resilient means will swing said arms upwardly rearwardly to effect an upward and rearward swinging movement of the conveyor structure to permit the conveyor to rise over the hard-to-move object.

References Cited in the file of this patent
UNITED STATES PATENTS

| | | |
|---|---|---|
| 265,325 | Jonas | Oct. 3, 1882 |
| 1,148,954 | Carr | Aug. 3, 1915 |
| 1,254,802 | Hoffer | Jan. 29, 1918 |
| 1,409,744 | Loeber | Mar. 14, 1922 |
| 2,626,039 | Wetherington | Jan. 20, 1953 |
| 2,791,041 | Hancock | May 7, 1957 |
| 2,984,022 | Johnson | May 16, 1961 |